R. M. BENNETT.
BELT FASTENER.
APPLICATION FILED AUG. 5, 1908.
928,840.
Patented July 20, 1909.
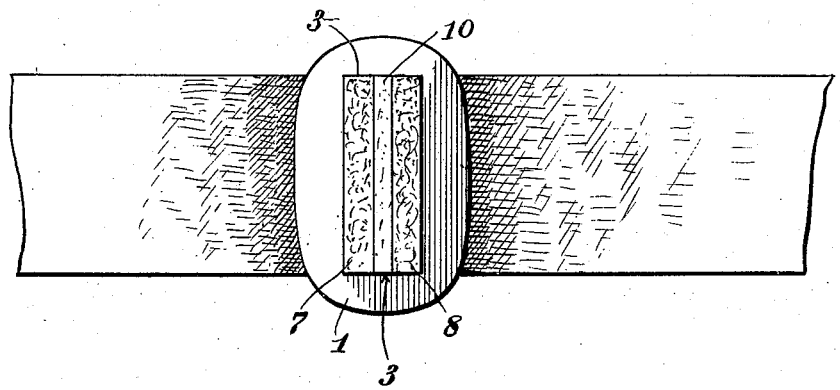
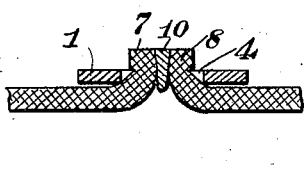 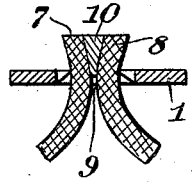
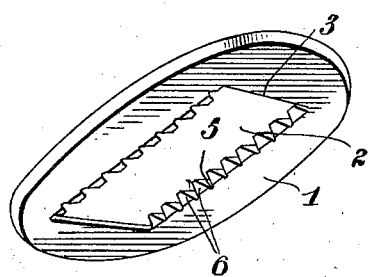
Witnesses
Inventor
R. M. Bennett
By
Attorney

UNITED STATES PATENT OFFICE.

RICHARD M. BENNETT, OF INDIANAPOLIS, INDIANA.

BELT-FASTENER.

No. 928,840.     Specification of Letters Patent.     Patented July 20, 1909.

Application filed August 5, 1908. Serial No. 447,104.

*To all whom it may concern:*

Be it known that I, RICHARD M. BENNETT, a citizen of the United States of America, residing at Indianapolis, in the county of Marion and State of Indiana, have invented certain new and useful Improvements in Belt-Fasteners, of which the following is a specification, reference being had therein to the accompanying drawing.

My invention relates to improvements in belt coupling and pertains more particularly to drive belts.

The object of my invention is to provide a belt coupling, in which the two ends of a drive belt may be readily fastened together and rigidly held, yet allowing for the ready uncoupling of the two ends.

Another object of my invention is to provide a more simple, cheap and effective coupling, having certain details of structure, whereby the greater the pressure on the belt the tighter the ends of the belt are clamped.

In the accompanying drawings, Figure 1 is a top plan view of my coupling, showing the belt coupled thereto. Fig. 2 is a transverse sectional view showing the belt and wedge in their normal operative position. Fig. 3 is a transverse sectional view, showing the belt and wedge inserted in the coupling before any pressure has been applied to the belt. Fig. 4 is a bottom perspective view of the coupling.

Referring now to the drawings, 1 represents my improved coupling, which consists of an oval thin flat piece of metal having a rectangular opening 2, extending therethrough. The end walls 3 of the opening are made perfectly straight, while the side walls are formed with teeth 4. The said teeth are formed in said walls by notches 5 and the lower face of the teeth is beveled as indicated at 6, whereby the same are caused to enter the belt by pressure thereon, which will be hereinafter more fully described. The distance between the inner edges of the teeth 4, is preferably slightly greater than the thickness of the two ends 7 and 8 of the belt as shown in Fig. 3, leaving the slight space 9 between the ends of the belt.

The two straight ends 7 and 8 of the belt are inserted within the opening 2 of the plate and extend a considerable distance above the teeth 4. The wedge 10 is then inserted between the two ends of the belt, with its lower end about in a horizontal line with the upper face of the coupling 1. This wedge is preferably made of leather, as this has been found more effective, and it has also been found that by using leather there is less liability of the wedge becoming displaced. The ends of the belt as shown, extend nearly vertically, and by drawing or pulling upon the belt, the ends are drawn downwardly through the openings. During this operation, the teeth 4 are biting into the ends of the belt and the wedge is also being drawn downwardly wedging two ends of the belt within the opening 2 in the coupling. When the teeth 4 have embedded themselves in the end of the belt, the wedge 10 has been drawn downwardly to bring the lower end slightly below the lower face of the coupling, 1. It is understood that the opening 2 in the coupling is such that the ends 7 and 8 of the belt and the wedge cannot possibly pass through the same, thus wedging the ends of the belt within the coupling. The tension of the belt causes it or the ends, to lie flat against the beveled portion 6 of the teeth and engage the lower face of the plate adjacent the opening, but does not engage the lower face of the coupling plate throughout its width. This as will be understood depends upon the tension on the belt and also the thickness and flexibility of the belt, as a thin flexible belt would possibly lie flat against the coupling.

While I have shown and described the distance between the inner edges of the teeth, as slightly greater than the thickness of the two ends of the belt, it will be understood that this is not absolutely necessary, as the ends of the belt would be spread apart and the wedge inserted and the teeth biting into the belt would provide sufficient room to allow the wedge to be carried down with the ends of the belt and assume approximately the same position as that where the slight space is left between the ends.

The plate 1 is shown of an oval form which provides curved or rounded outer ends to allow the belt shifter to readily pass over the coupling.

Having thus fully described the invention, what I claim as new, is:—

A belt coupling comprising a thin flat plate having an elongated opening therethrough, teeth carried by the sides of said opening and having beveled lower faces and the distance between the inner end of the teeth being approximately equal to the thickness of the two ends of the belt, and a wedge between the ends of the belt and adapted to be drawn downwardly by frictional contact with the belt through the opening and forcing the teeth into the belt by the tension of the belt.

In testimony whereof I affix my signature in presence of two witnesses.

RICHARD M. BENNETT.

Witnesses:
  JOSEPH KENNELLY,
  JOHN FIELDS.